(12) United States Patent
Kono

(10) Patent No.: US 8,564,814 B2
(45) Date of Patent: Oct. 22, 2013

(54) IMAGE-READING SYSTEM, CONTROL DEVICE, CONTROL METHOD, AND COMPUTER READABLE MEDIUM

(75) Inventor: Daisuke Kono, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 855 days.

(21) Appl. No.: 12/702,720

(22) Filed: Feb. 9, 2010

(65) Prior Publication Data

US 2011/0051178 A1 Mar. 3, 2011

(30) Foreign Application Priority Data

Aug. 26, 2009 (JP) ................................. 2009-195027

(51) Int. Cl.
*G06F 15/00* (2006.01)

(52) U.S. Cl.
USPC ......... 358/1.15; 358/400; 358/1.13; 715/740; 715/747

(58) Field of Classification Search
USPC ............... 358/1.15, 1.16, 1.13, 402; 715/853, 715/740, 747
See application file for complete search history.

(56) References Cited

U.S. PATENT DOCUMENTS

| | | | | |
|---|---|---|---|---|
| 6,658,325 B2 * | 12/2003 | Zweig | | 700/245 |
| 7,116,434 B2 * | 10/2006 | Abe | | 358/1.15 |
| 7,117,444 B2 * | 10/2006 | Takao et al. | | 715/740 |
| 7,562,223 B2 * | 7/2009 | Ragnet et al. | | 713/171 |
| 7,814,254 B2 * | 10/2010 | Abumi | | 710/302 |
| 8,074,183 B2 * | 12/2011 | Ito | | 715/853 |
| 2002/0054316 A1 * | 5/2002 | Abe | | 358/1.14 |
| 2004/0190035 A1 * | 9/2004 | Ozawa et al. | | 358/1.13 |
| 2005/0105129 A1 | 5/2005 | Takahashi | | |
| 2006/0082801 A1 | 4/2006 | Ohishi | | |
| 2006/0222176 A1 | 10/2006 | Ohishi | | |
| 2008/0209341 A1 * | 8/2008 | Kashiwagi | | 715/747 |
| 2009/0257090 A1 * | 10/2009 | Ozawa et al. | | 358/1.15 |

FOREIGN PATENT DOCUMENTS

| | | |
|---|---|---|
| JP | A 2005-151010 | 6/2005 |
| JP | A 2005-167988 | 6/2005 |
| JP | A 2006-148876 | 6/2006 |
| JP | A 2006-309719 | 11/2006 |

* cited by examiner

*Primary Examiner* — Steven Kau
*Assistant Examiner* — Ashish K Thomas
(74) *Attorney, Agent, or Firm* — Oliff & Berridge, PLC

(57) ABSTRACT

An image-reading system includes an image-reading device that includes: a first creating unit that creates, if a control device requests creation of a content of a settings screen, a content of a first settings screen for setting a scan condition supported by the available function of an image-reading unit expressed by stored function information; a generating unit that generates, when a scan condition is set on the first settings screen whose content is created by the first creating unit, first instruction data to read an image in accordance with the set scan condition; and a reading controller that controls the image-reading unit based on the generated first instruction data, so that the image-reading unit reads an image in accordance with the set scan condition.

6 Claims, 11 Drawing Sheets

FIG. 7

SCAN SETTINGS

COLOR MODE
- ○ AUTOMATIC
- ● FULL-COLOR
- ○ GRAY SCALE (·····)
- ○ MONOCHROME (·····)

DOUBLE-SIDED DOCUMENT FEED
- ○ SINGLE SIDE
- ● DOUBLE SIDES (HEAD TO HEAD)
- ○ DOUBLE SIDES (HEAD TO TOE)

OUTPUT FILE FORMAT
- ● TIFF
- ○ ANOTHER OUTPUT FILE FORMAT

·····

[SET]

FIG. 8

PLEASE PUSH [START] BUTTON, IF YOU WOULD LIKE TO START SCANNING.
  SCAN SETTINGS
    COLOR MODE              : FULL-COLOR
    DOUBLE-SIDED DOCUMENT FEED : DOUBLE SIDES
    OUTPUT FILE FORMAT : TIFF
        ⋮

SETTINGS OF WORKFLOW PROCESS
    WORKFLOW ID            : ···
    EMPLOYEE ID NUMBER     : 12345
    E-MAIL ADDRESS         : 12345@aaa.bbb.ccc
    STORAGE DESTINATION    : ···
        ⋮

[ADJUST SETTINGS] [START]

FIG. 10

```
Div id="SCAN PARAMETER SETTING TAB"            ┌─71

ScanSettings.CreateScanSettings();
    // INSTRUCT FOR CONTENT CREATING SCRIPT TO
    CREATE CONTENT OF SETTINGS
```

FIG. 11

```
                                               ┌─71
Div id="SETTING TAB OF SCAN PARAMETER"

Div id="SCAN PARAMETER SETTINGS"

Div id="SETTINGS OF COLOR MODE"

Table id="COLOR MODE"
        Input id="COLOR_MODE_0" value="AUTOMATIC"
        Input id="COLOR_MODE_1" value="FULL-COLOR"
        Input id="COLOR_MODE_2" value="GRAY SCALE"
        Input id="COLOR_MODE_3" value="MONOCHROME"

Div id="SETTINGS OF DOUBLE-SIDED DOCUMENT FEED"

Table id="DOUBLE-SIDED DOCUMENT FEED"
        . . .

Div id="SETTINGS OF OUTPUT FILE FORMAT"

Table id="OUTPUT FILE FORMAT"
        . . .

Div id="········"

Table id="········"
        . . .
```

FIG. 12

SCAN SETTINGS

COLOR MODE
- ○ AUTOMATIC
- ● FULL-COLOR
- ○ GRAY SCALE (·····)
- ○ MONOCHROME (·····)

DOUBLE-SIDED DOCUMENT FEED
- ○ SINGLE SIDE
- ● DOUBLE SIDES (HEAD TO HEAD)
- ○ DOUBLE SIDES (HEAD TO TOE)

OUTPUT FILE FORMAT
- ○ TIFF
- ● PDF
- ○ ANOTHER OUTPUT FILE FORMAT

·····

SET

FIG. 13

PLEASE PUSH [START] BUTTON, IF YOU WOULD LIKE TO START SCANNING.
  SCAN SETTINGS
    COLOR MODE             : FULL-COLOR
    DOUBLE-SIDED DOCUMENT FEED : DOUBLE SIDES
    OUTPUT FILE FORMAT  : PDF
        ⋮

SETTINGS OF WORKFLOW PROCESS
    WORKFLOW ID           : ···
    EMPLOYEE ID NUMBER     : 12345
    E-MAIL ADDRESS         : 12345@aaa.bbb.ccc
    STORAGE DESTINATION    : ···
        ⋮

ADJUST SETTINGS    START

IMAGE-READING SYSTEM, CONTROL DEVICE, CONTROL METHOD, AND COMPUTER READABLE MEDIUM

CROSS-REFERENCE TO RELATED APPLICATIONS

This application is based on and claims priority under 35 USC 119 from Japanese Patent Application No. 2009-195027 filed on Aug. 26, 2009.

BACKGROUND

1. Technical Field

The present invention relates to an image-reading system, a control device, a control method, and a computer readable medium.

2. Related Art

A technique for generating a settings screen corresponding to functions of an image-forming device is known in the art.

SUMMARY

According to an aspect of the invention, there is provided an image-reading system including: a control device that includes: a first memory that stores first device information assigned to an image-reading device having predetermined image-reading functions; a first receiving unit that receives second device information; and a requesting unit that requests, if the received second device information is not included in the stored first device information, creation of a content of a settings screen for setting a scan condition; and an image-reading device that includes: an image-reading unit that reads an image and converts the image to image data; a second memory that stores function information expressing an available function of the image-reading unit; a first sending unit that sends second device information assigned to the image-reading device to the control device; a first creating unit that creates, if the requesting unit requests creation of a content of a settings screen, a content of a first settings screen for setting a scan condition supported by the available function of the image-reading unit expressed by the stored function information; a generating unit that generates, when a scan condition is set on the first settings screen whose content is created by the first creating unit, first instruction data to read an image in accordance with the set scan condition; and a reading controller that controls the image-reading unit based on the generated first instruction data, so that the image-reading unit reads an image in accordance with the set scan condition.

BRIEF DESCRIPTION OF THE DRAWINGS

Exemplary embodiment of the present invention will be described in detail based on the following figures, wherein:

FIG. 7 is a diagram showing an example of a scan settings screen in the first scan setting process;

FIG. 8 is a diagram showing an example of a confirmation screen in the first scan setting process;

FIG. 10 is a diagram showing an overview of a description of HTML data whose content is not described;

FIG. 11 is a diagram showing an overview of a description in a setting tab;

FIG. 12 is a diagram showing an example of a scan settings screen in the second scan setting process;

FIG. 13 is a diagram showing an example of a confirmation screen in the second scan setting process;

DETAILED DESCRIPTION

Configuration

Figure 1:
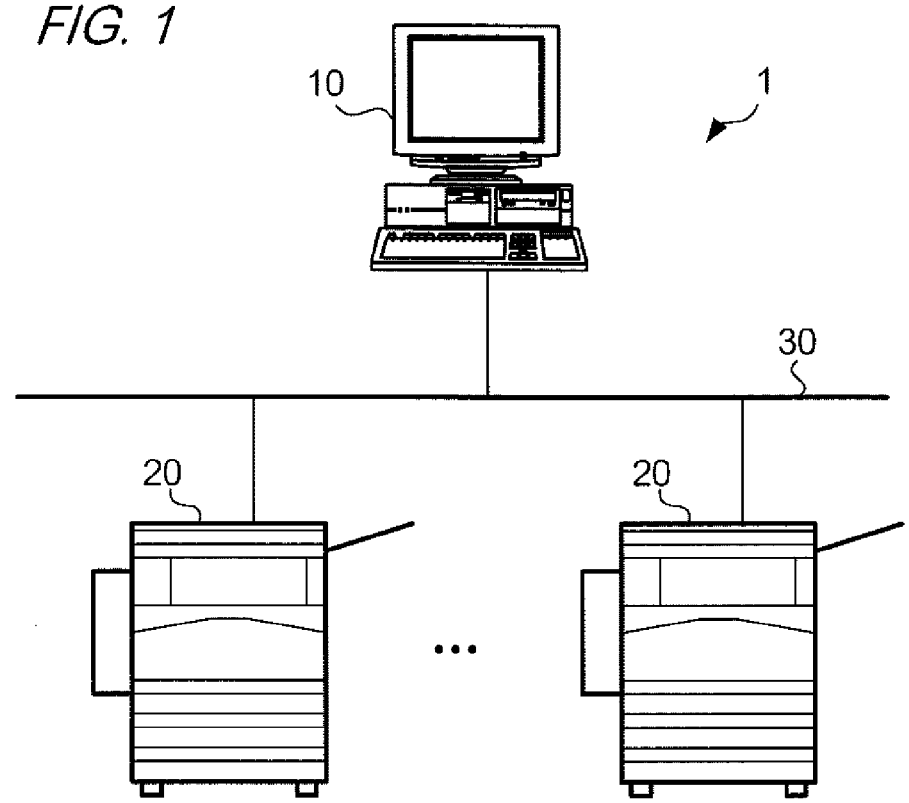
FIG. 1 is a diagram showing a configuration of a workflow system.

Following is a description of workflow system 1 of the exemplary embodiment. FIG. 1 is a diagram showing a configuration of workflow system 1. As shown in FIG. 1, workflow system 1 includes server device 10 and plural image-forming devices 20. Server device 10 and image-forming devices 20 are connected via a communication network 30, such as a Local Area Network (LAN).

Figure 2:
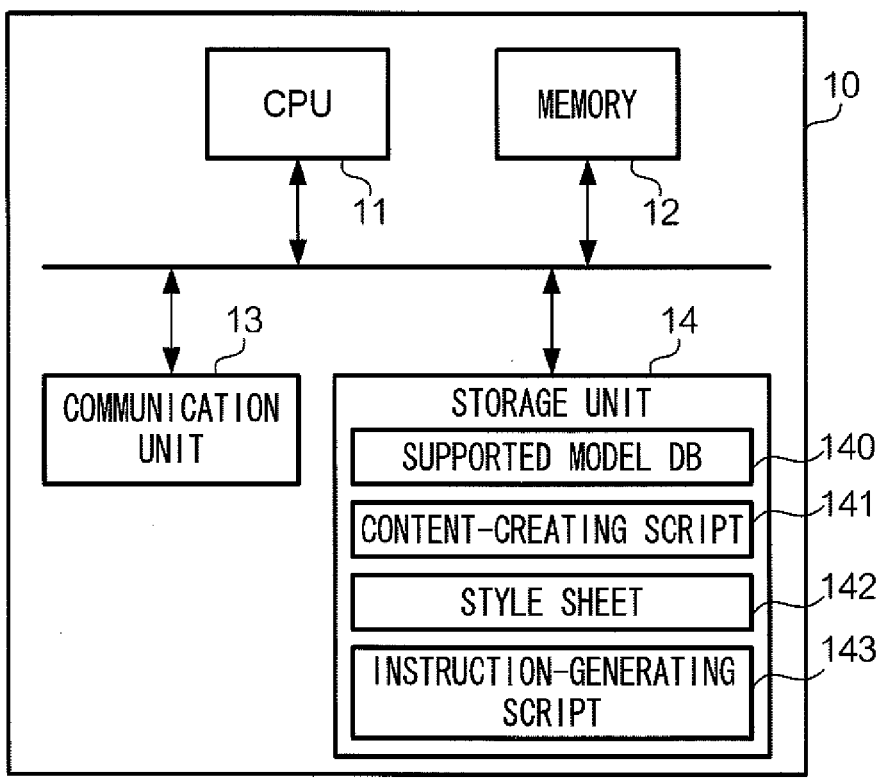
FIG. 2 is a diagram showing a hardware configuration of a server device.

FIG. 2 is a diagram showing a hardware configuration of server device 10. Server device 10 includes Central Processing Unit (CPU) 11, memory 12, communication unit 13, and storage unit 14 (an example of a first memory). CPU 11 controls each part of server device 10 by executing programs stored in memory 12. Memory 12 includes, for example, a Read Only Memory (ROM) and a Random Access Memory (RAM), and stores data and programs executed by CPU 11. Communication unit 13 establishes communication with image-forming devices 20 connected via communication network 30, and sends data to and receives data from image-forming devices 20. Storage unit 14 includes, for example, a hard disk, and stores a web application that cooperates with a web browser. Storage unit 14 also stores supported model database 140. Supported model database 140 stores information on models of image-forming device(s) 20 (referred to below as "known image-forming device(s)"), which devices were available prior to release of the stored web application, and have predetermined functions. Supported model database 140 includes model information (an example of first device information) expressing each model of known image-forming device(s) 20. Storage unit 14 further stores content-creating script 141, style sheet 142, and instruction-generating script 143 (an example of a first program). It is noted that the term "script" is used herein to refer to a program for performing a predetermined process.

Figure 3:
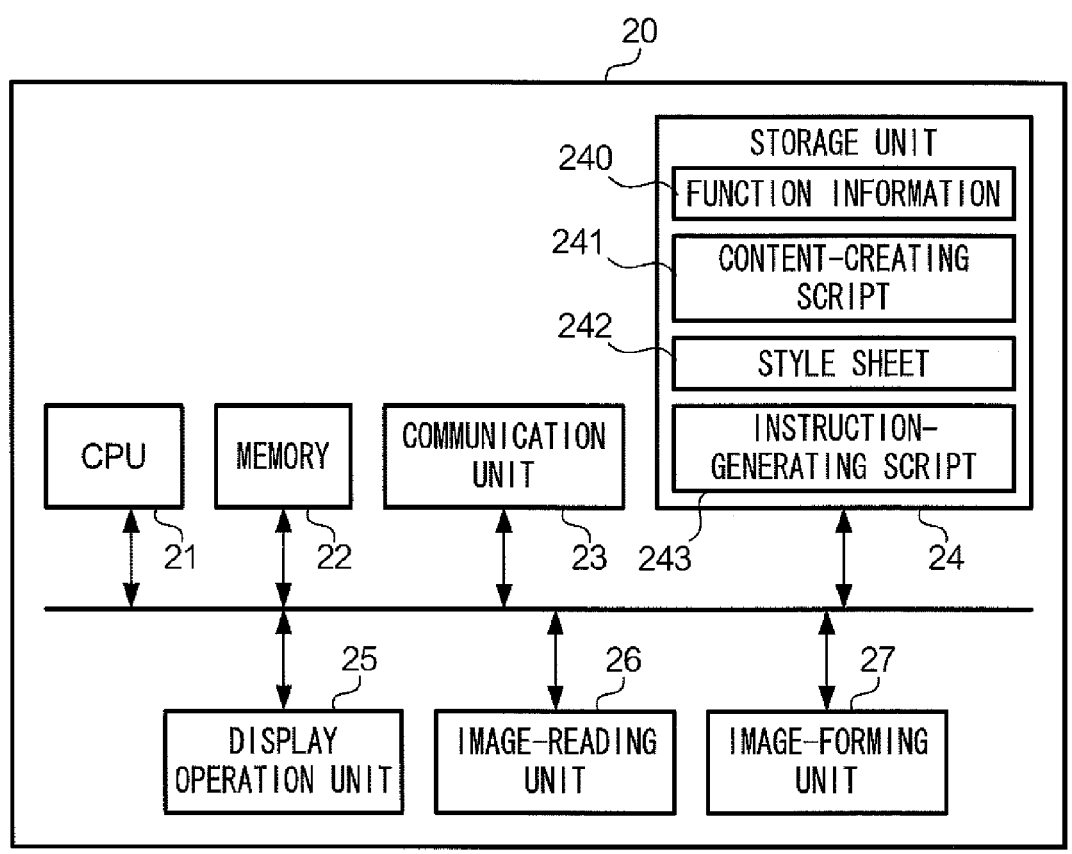
FIG. 3 is a diagram showing a hardware configuration of an image-forming device.

FIG. 3 is a diagram showing a hardware configuration of image-forming device 20. Image-forming device 20 has multiple functions, such as a print function, a scan function, and a copy function. Image-forming device 20 includes CPU 21, memory 22, communication unit 23, storage unit 24 (an example of a second memory), display operation unit 25, image-reading unit 26, and image-forming unit 27. CPU 21 controls each part of image-forming device 20 by executing programs stored in memory 22. Memory 22 includes, for example, a ROM and a RAM, and stores data and programs executed by CPU 21. Communication unit 23 establishes communication with server device 10 connected via communication network 30, and sends data to and receives data from server device 10. Storage unit 24 includes, for example, a hard disk, and stores function information 240 expressing functions supported by image-reading unit 26. Function information 240 includes, for example, information of a color mode, a document-feeding method, and an output data format supported by image-reading unit 26. Storage unit 24 also stores content-creating script 241, style sheet 242, and instruction-generating script 243 (an example of a second program). Display operation unit 25 includes, for example, a touch panel display, and displays an image based on a control of CPU 21, and inputs a signal of a user operation to CPU 21. Image-reading unit 26 includes, for example, an image scanner, and optically reads an image and converts it to image data. Image-forming unit 27 includes, for example, a printer forming an image by using electrophotography. Image-forming unit 27 forms on a recording medium an image from image data, and outputs the recording medium containing the image.

Figure 4:
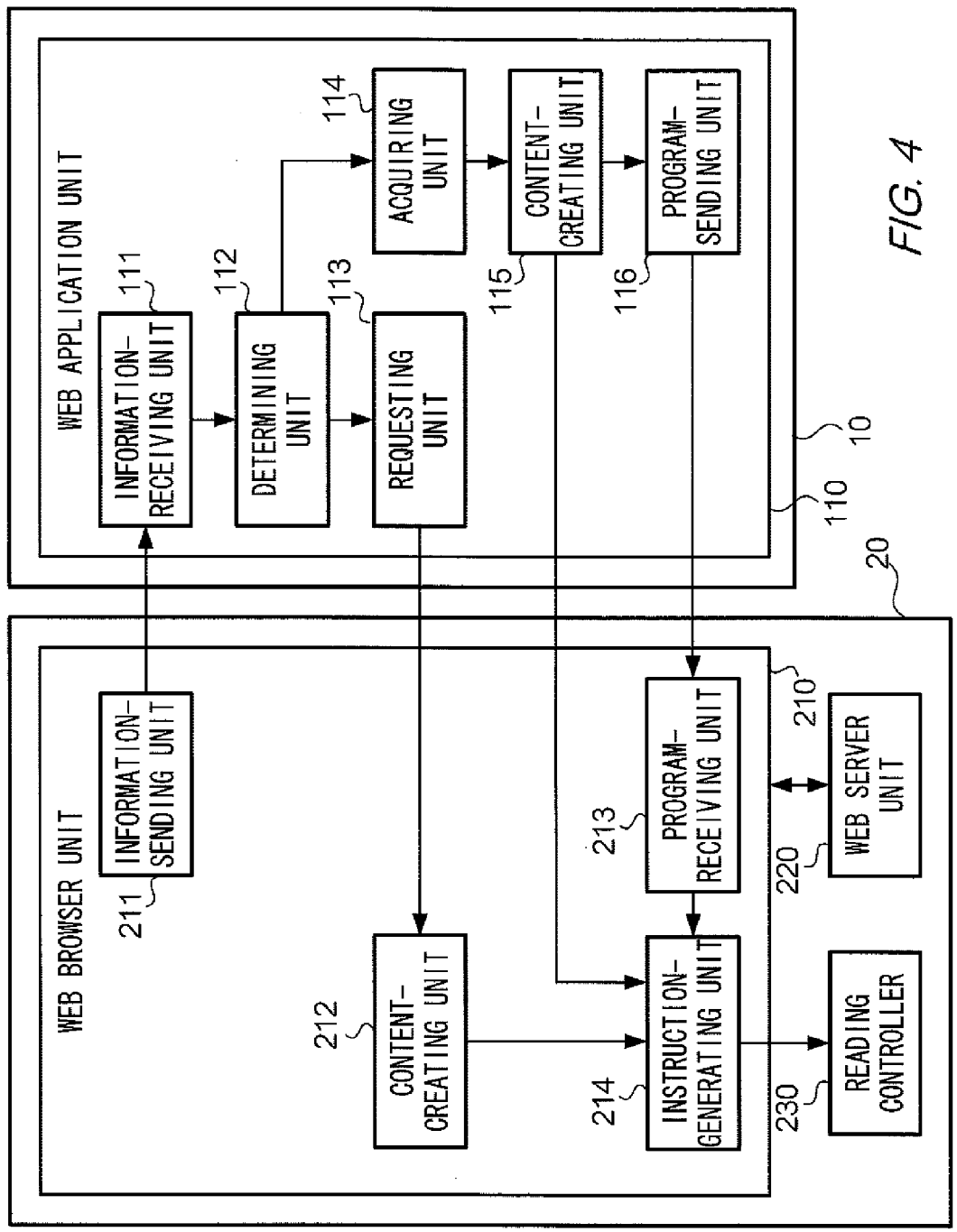
FIG. 4 is a diagram showing a function configuration of the workflow system.

FIG. 4 is a diagram showing a function configuration of workflow system 1. Server device 10 includes a function of web application unit 110. Web application unit 110 is realized by executing the web application stored in storage unit 14. Web application unit 110 includes information-receiving unit 111, determining unit 112, requesting unit 113, acquiring unit 114, content-creating unit 115, and program-sending unit 116. Information-receiving unit 111, which is an example of a first receiving unit, receives device information sent from image-forming device 20. Determining unit 112 determines whether the device information received by information-receiving unit 111 is included in device information stored in the storage unit 14. Requesting unit 113 requests the image-forming device 20 to create a content of a settings screen to be used for setting a scan condition, if determining unit 112 determines that the received device information is not included in the stored device information. Acquiring unit 114 acquires function information 240 stored in the storage unit 24 of image-forming device 20, if determining unit 112 determines that the received device information is included in stored device information. Content-creating unit 115, which is an example of a second creating unit, creates a content of a settings screen to be used for setting a scan condition supported by function information 240 of image-reading unit 26 acquired by acquiring unit 114. Content-creating unit 115 can interpret function information 240 acquired from a known image-forming device, and thus can create a settings screen corresponding to the available functions of image-reading unit 26. However, content-creating unit 115 may not be able to interpret all of function information 240 acquired from an unknown image-forming device, rather than a known image-forming device, and thus may not create a settings screen corresponding to the available functions of image-reading unit 26. Content-creating unit 115 is realized by CPU 11 executing content-creating script 141 stored in storage unit 14. Program-sending unit 116, which is an example of a second sending unit, sends instruction-generating script 143 stored in storage unit 14 to image-forming unit 20, if determining unit 112 determines that the received device information is included in the stored device information.

Image-forming device 20 includes functions of web browser unit 210, web server unit 220, and reading controller 230. Web browser unit 210 includes information-sending unit 211, content-creating unit 212, program-receiving unit 213, and instruction-generating unit 214. Information-sending unit 211, which is an example of a first sending unit, sends device information assigned to the image-forming device 20 to server device 10. Content-creating unit 212, which is an example of a first creating unit, creates a content of a settings screen, if requesting unit 113 of server device 10 makes a request to create a content of a settings screen. This settings screen is used for setting a scan condition supported by an ability of image-reading unit 26, which is expressed by function information 240 stored in storage unit 24. Content-creating unit 212 is realized by CPU 21 executing content-creating script 214 stored in storage unit 24. Program-receiving unit 213, which is an example of a second receiving unit, receives instruction-generating script 143 sent from program-sending unit 116 of server device 10. Instruction-generating unit 214 generates instruction data by executing instruction-generating script 243 stored in storage unit 24, if the requesting unit 113 of server device 10 makes a request to create a content of a settings screen. This instruction data instructs to read an image in accordance with a scan condition that is set on the settings screen whose content is created by content-creating unit 212. Meanwhile if program-sending unit 116 of server device 10 sends instruction-generating script 143, instruction-generating unit 214 generates instruction data by executing instruction-generating script 143 received by program-receiving unit 213. This instructing data instructs to read an image in accordance with the scan condition that is set on the settings screen whose content is created by content-creating unit 115 of server device 10. Web server unit 220 has a function of web server. Reading controller 230 controls, based on the instruction data generated by instruction-generating unit 214, image-reading unit 26 to read an image in accordance with the scan condition that is set on the settings screen.

Operation

Figure 5:
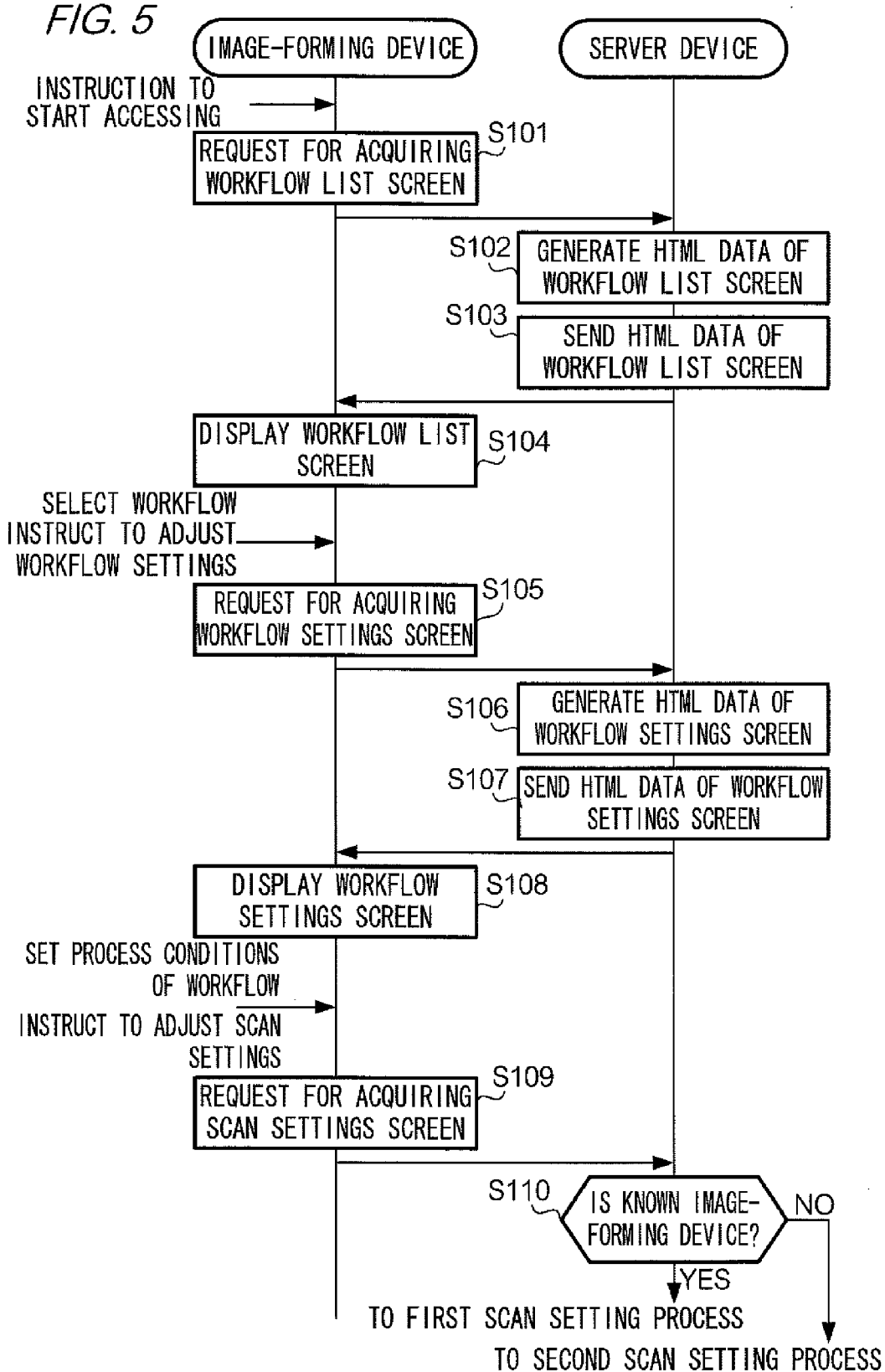
FIG. 5 is a sequence diagram showing a process of the workflow system.

Following is a description of an operation of workflow system 1 of the exemplary embodiment. Workflow system 1 functions to read a document set by a user, and register the reading result to an indicated workflow. It is noted that workflow system 1 includes both known image-forming device 20 and unknown image-forming device 20 other than known image-forming device 20. FIG. 5 is a sequence diagram showing a process of workflow system 1. A user operates display operation unit 25 to input instructions to start accessing server device 10. When these instructions are inputted, CPU 21 sends a request for acquiring a workflow list screen from communication unit 23 to server device 10 (Step S101). This request includes a device ID, model information, and version information, which are assigned to image-forming device 20 in advance. The model information identifies a model of image-forming device 20. The version information identifies a version of the web browser of image-forming device 20.

CPU 11 of server device 10 receives this request via communication unit 13, and stores the device ID, the model information, and the version information included in the received request in memory 12. CPU 11 generates HyperText Markup Language (HTML) data of the workflow list screen that expresses a list of registered workflows (Step S102). It is noted that "HTML data" refers to data described in HTML format. CPU 11 sends the generated HTML data of the workflow list screen from communication unit 13 to image-forming device 20 (Step S103). CPU 21 of image-forming device 20 receives this HTML data via communication unit 23, and displays the workflow list screen expressed by the received HTML data, on display operation unit 25 (Step S104). When the workflow list screen is displayed, the user operates display operation unit 25 to select a desired workflow and input instructions to adjust workflow settings.

When the instructions to adjust workflow settings are inputted on the workflow list screen, CPU 21 sends a request for acquiring a workflow settings screen from communication unit 23 to server device 10 (Step S105). This request includes a workflow ID used for identifying the selected workflow. CPU 11 of server device 10 receives this request via communication unit 13, and generates HTML data of a workflow settings screen for adjusting workflow settings whose workflow ID is included in the request (Step S106). CPU 11 sends the generated HTML data of the workflow settings screen from communication unit 13 to image-forming device 20 (Step S107). CPU 21 of image-forming device 20 receives this HTML data via communication unit 23, and displays the workflow settings screen expressed by the received HTML data, on display operation unit 25 (Step S108). When the workflow settings screen is displayed, the user operates display operation unit 25 to set process conditions of the workflow and input instructions to adjust scan settings. The process conditions of the workflow include, for example, an employee ID number and E-mail address of an authorizing user, and a storage destination of image data of a document.

When the instructions to adjust scan settings are inputted on the workflow settings screen, CPU 21 sends a request for acquiring a scan settings screen from communication unit 23 to server device 10 (Step S109). This request includes process conditions of the workflow set by the user operation. CPU 11 of server device 10 receives this request via communication unit 13, and stores the process conditions of the workflow included in the received request in memory 12. CPU 11 compares the model information stored in memory 12 with supported model database 140 stored in storage unit 14, and determines whether requesting image-forming device 20 is the known image-forming device (Step S110). More specifically, if the model information stored in memory 12 is included in supported model database 140, CPU 11 determines that requesting image-forming device 20 is a known image-forming device. Meanwhile, if the model information stored in memory 12 is not included in supported model database 140, CPU 11 determines that requesting image-forming device 20 is not a known image-forming device. By this determination, if requesting image-forming device 20 is determined to be a known image-forming device (Step S110; YES), CPU 11 advances to the first scan setting process. Meanwhile, if requesting image-forming device 20 is determined to be other than a known image-forming device (Step S110; NO), CPU 11 advances to the second scan setting process.

Figure 6:
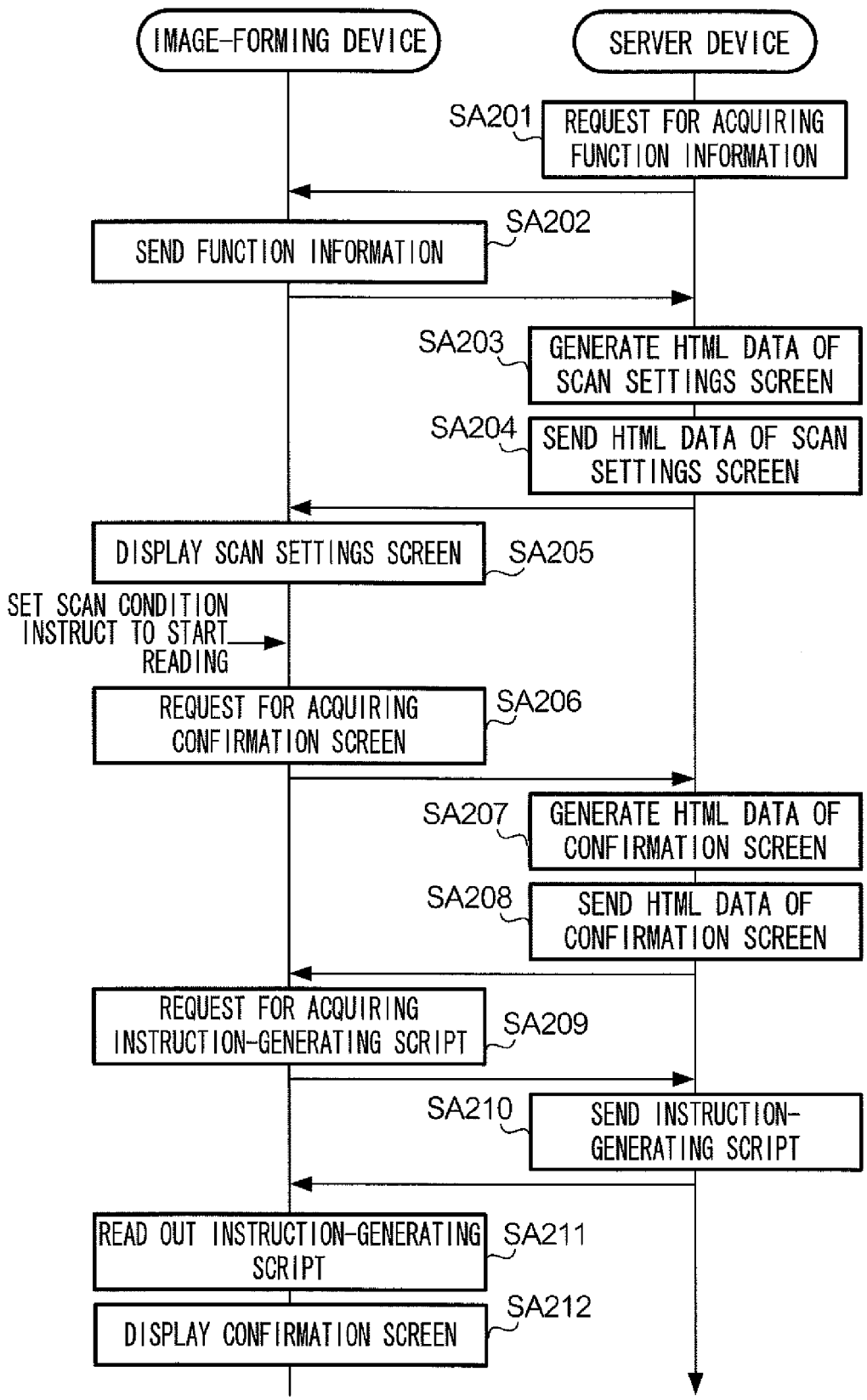
FIG. 6 is a sequence diagram showing a first scan setting process.

Next, the first scan setting process is described. FIG. 6 is a sequence diagram showing the first scan setting process. First, CPU 11 of server device 10 sends a request for acquiring function information 240 from communication unit 13 to image-forming device 20 (Step SA201). CPU 21 of image-forming device 20 receives this request via communication unit 23. CPU 21 then reads out the function information 240 stored in storage unit 24, and sends the function information 240 from communication unit 23 to server device 10 (Step SA202). CPU 11 of server device 10 receives function information 240 sent from image-forming device 20 via communication unit 13. In other words, if model information of image-forming device 20 is stored in storage unit 24, CPU 11 acquires function information 240 stored in storage unit 24 of image-forming device 20.

CPU 21 generates HTML data of a scan settings screen based on received function information 240 (Step SA203). FIG. 7 is a diagram showing an example of scan settings screen 51. On scan settings screen 51, scan conditions that are supported by functions of image-reading unit 26 expressed by function information 240 are displayed and are selectable. In other words, scan conditions that image-reading unit 26 can process are displayed on scan settings screen 51. For example, in a case that image-reading unit 26 supports a "full-color" mode, color modes of "automatic," "full-color," "gray scale," and "monochrome" are displayed on scan settings screen 51 so as to be selectable, as shown in FIG. 7. In a case that image-reading unit 26 supports an output file format of "TIFF," output file formats of "TIFF" and "another output file format" are displayed so as to be selectable, as shown in FIG. 7. In other words, CPU 11 generates a content of a settings screen for setting scan conditions that are supported by available functions of image-reading unit 26, which are expressed by acquired function information 240. It is noted that a corresponding relationship between available functions of image-reading unit 26 and scan conditions is determined in advance.

Then, CPU 11 sends the generated HTML data of the scan settings screen from communication unit 13 to image-forming device 20 (Step SA204). CPU 21 of image-forming device 20 receives this HTML data via communication unit 23, and displays scan settings screen 51 expressed by the received HTML data on display operation unit 25 (Step SA205). When scan settings screen 51 is displayed, the user operates display operation unit 25 to set scan conditions and input instructions to start reading. Here, it is assumed that scan conditions including a color mode of "full-color," a document feed of "double sides," and an output file format of "TIFF" are displayed on scan settings screen 51 shown in FIG. 7.

When the instructions to start reading are inputted, CPU 21 sends a request for acquiring confirmation screen 52 used for confirmation of details of a process, from communication unit 23 to server device 10 (Step SA206). This request includes the scan conditions set by the user operation. CPU 11 of server device 10 receives this request via communication unit 13, and stores the scan conditions included in the received request in memory 12. CPU 11 generates HTML data of confirmation screen 52 based on the process conditions of the workflow and the scan conditions stored in memory 12 (Step SA207). FIG. 8 is a diagram showing an example of confirmation screen 52. As shown in FIG. 8, the scan conditions and the process conditions of the workflow set by the user operation are displayed on confirmation screen 52.

CPU 11 sends the generated HTML data of confirmation screen 52 from communication unit 13 to image-forming device 20 (Step SA208). CPU 21 of image-forming device 20 receives this HTML data via communication unit 23, and sends a request for acquiring instruction-generating script 143, from communication unit 23 to server device 10 (Step SA209). CPU 11 of server device 10 receives this request via communication unit 13, and sends instruction-generating script 143 stored in storage unit 14 from communication unit 13 to image-forming device 20 (Step SA210). CPU 21 of image-forming device 20 receives instruction-generating script 143 via communication unit 23, and reads out received instruction-generating script 143 (Step S211). CPU 21 displays confirmation screen 52 expressed by the HTML data received in step SA209, on display operation unit 25 (Step SA212).

Figure 9:
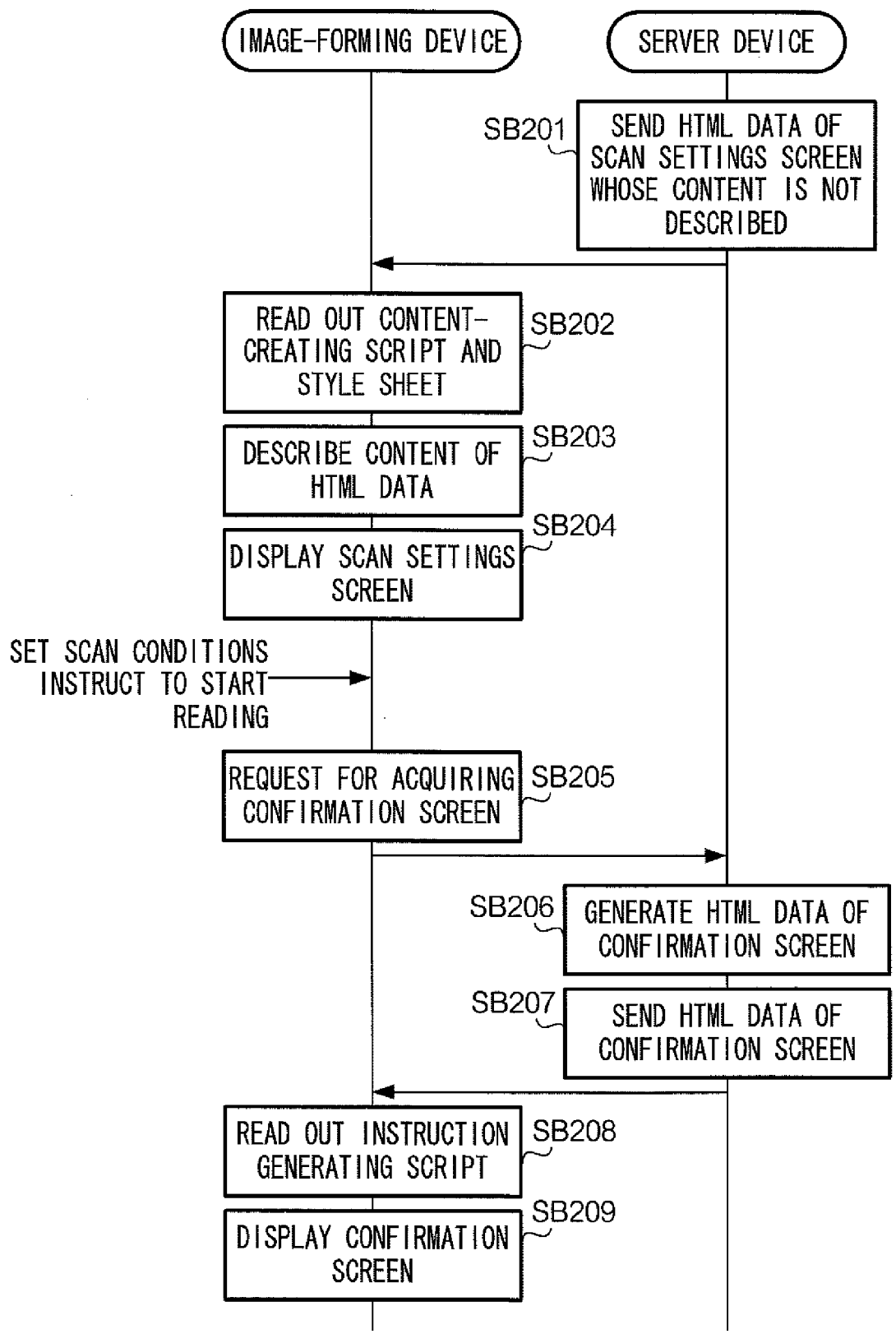
FIG. 9 is a sequence diagram showing a second scan setting process.

Next, the second scan setting process is described. FIG. 9 is a sequence diagram showing the second scan setting process. First, CPU 11 of server device 10 generates HTML data 71 of a scan settings screen whose content is not described, and sends this HTML data 71 from communication unit 13 to image-forming device 20 (Step SB201). FIG. 10 is a diagram showing an overview of a description of HTML data 71. As shown in FIG. 10, HTML data 71 describes instructions to create a content of a settings screen, but details of a setting tab, which are a content of HTML data 71, are not described. In other words, if model information of image-forming device 20 is not stored in storage unit 14, CPU 11 requests image-forming device 20 to create a content of a settings screen for setting a scan condition.

CPU 21 of image-forming device 20 receives HTML data 71 via communication unit 23, and reads out content-creating script 241 and style sheet 242 from storage unit 24 (Step SB202). CPU 21 executes content-creating script 241, and describes details of the setting tab, which is a content of HTML data 71, based on function information 240 stored in storage unit 24 (Step SB203). FIG. 11 is a diagram showing an overview of a description in the setting tab. The setting tab describes scan conditions supported by an ability of image-reading unit 26 expressed by function information 240. In other words, the setting tab describes scan conditions that image-reading unit 26 can process. For example, in a case that image-reading unit 26 supports a "full-color" mode, color modes of "automatic," "full-color," "gray scale" and "monochrome" are described so as to be selectable. In a case that image-reading unit 26 supports output file formats of "TIFF" and "PDF," output file formats of "TIFF," "PDF," and "another output file format" are described so as to be selectable. In other words, if server device 10 instructs to create a content of a settings screen, CPU 21 creates a content of a settings screen for setting scan conditions supported by functions of image-reading unit 26, which is expressed by function information 240 stored in storage unit 24.

Then, CPU 21 applies style sheet 242 to HTML data 71 describing details of the setting tab, and displays scan settings screen 61 on display operation unit 25 (Step SB204). FIG. 12 is a diagram showing an example of scan settings screen 61. On scan settings screen 61, scan conditions described in the setting tab of HTML data 71 are displayed and are selectable. When scan settings screen 61 is displayed, the user operates display operation unit 25 to set scan conditions and input instructions to start reading. Here, it is assumed that scan conditions including a color mode of "full-color," a document feed of "double sides," and an output file format of "PDF" are set on scan settings screen 61 shown in FIG. 12.

When the instructions to start reading are inputted, CPU 21 sends a request for acquiring confirmation screen 62 used for confirmation of details of a process, from communication unit 23 to server device 10 (Step SB205). This request includes the scan conditions set by the user operation. CPU 11 of server device 10 receives this request via communication unit 13, and stores the scan conditions included in the received request in memory 12. CPU 11 generates HTML data of confirmation screen 62 based on the process conditions of the workflow and the scan conditions stored in memory 12 (Step SB206). FIG. 13 is a diagram showing an example of confirmation screen 62. As shown in FIG. 13, the scan conditions and process conditions of the workflow set by the user operation are displayed on confirmation screen 62. CPU 11 sends the generated HTML data of confirmation screen 62 from communication unit 13 to image-forming device 20 (Step SB207). CPU 21 of image-forming device 20 receives this HTML data via communication unit 23, and reads out instruction-generating script 243 stored in storage unit 24 (Step SB208). CPU 21 displays confirmation screen 62 expressed by the received HTML data on display operation unit 25 (Step SB209).

Figure 14:
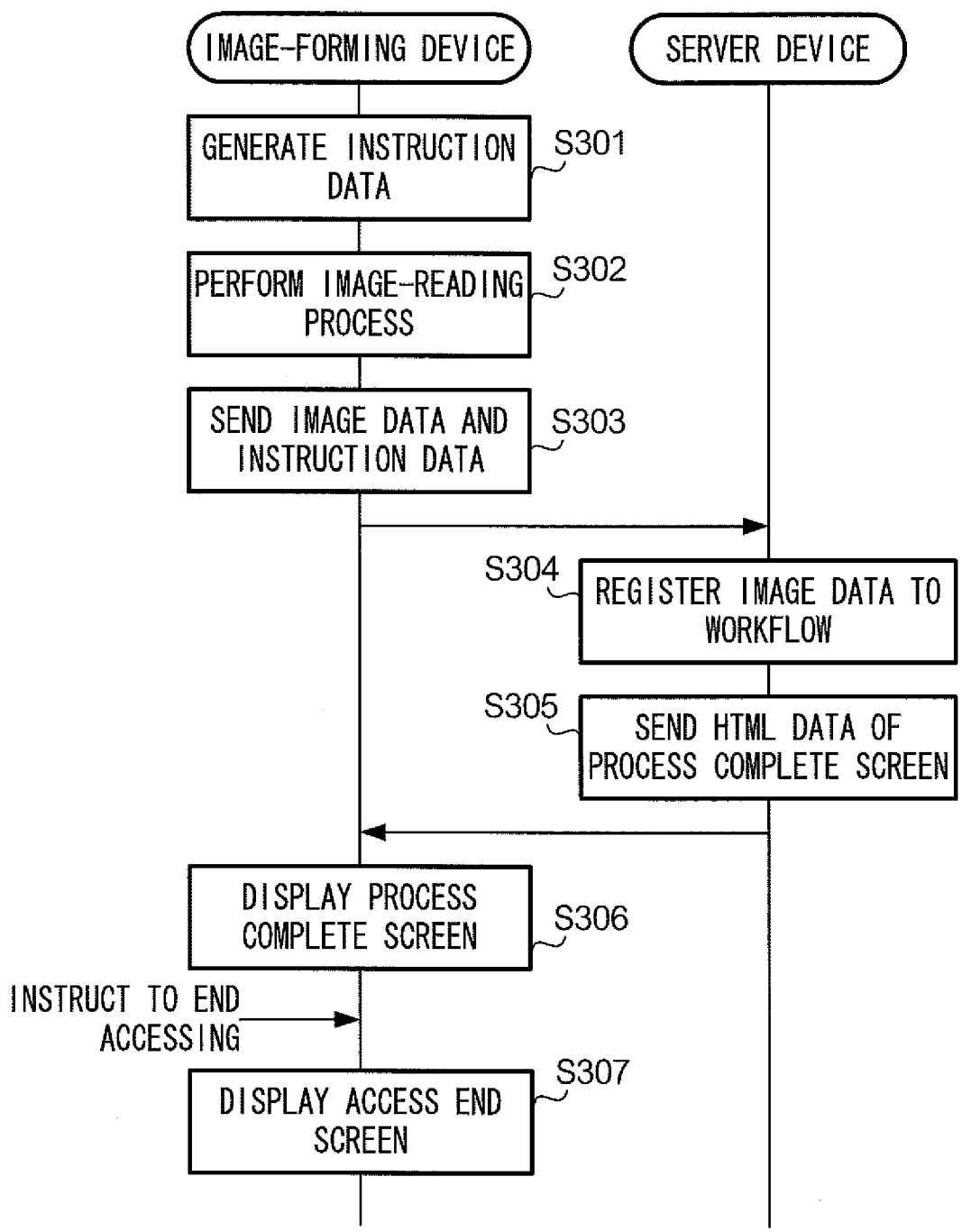
FIG. 14 is a sequence diagram showing a process of the workflow system.
Figure 15:
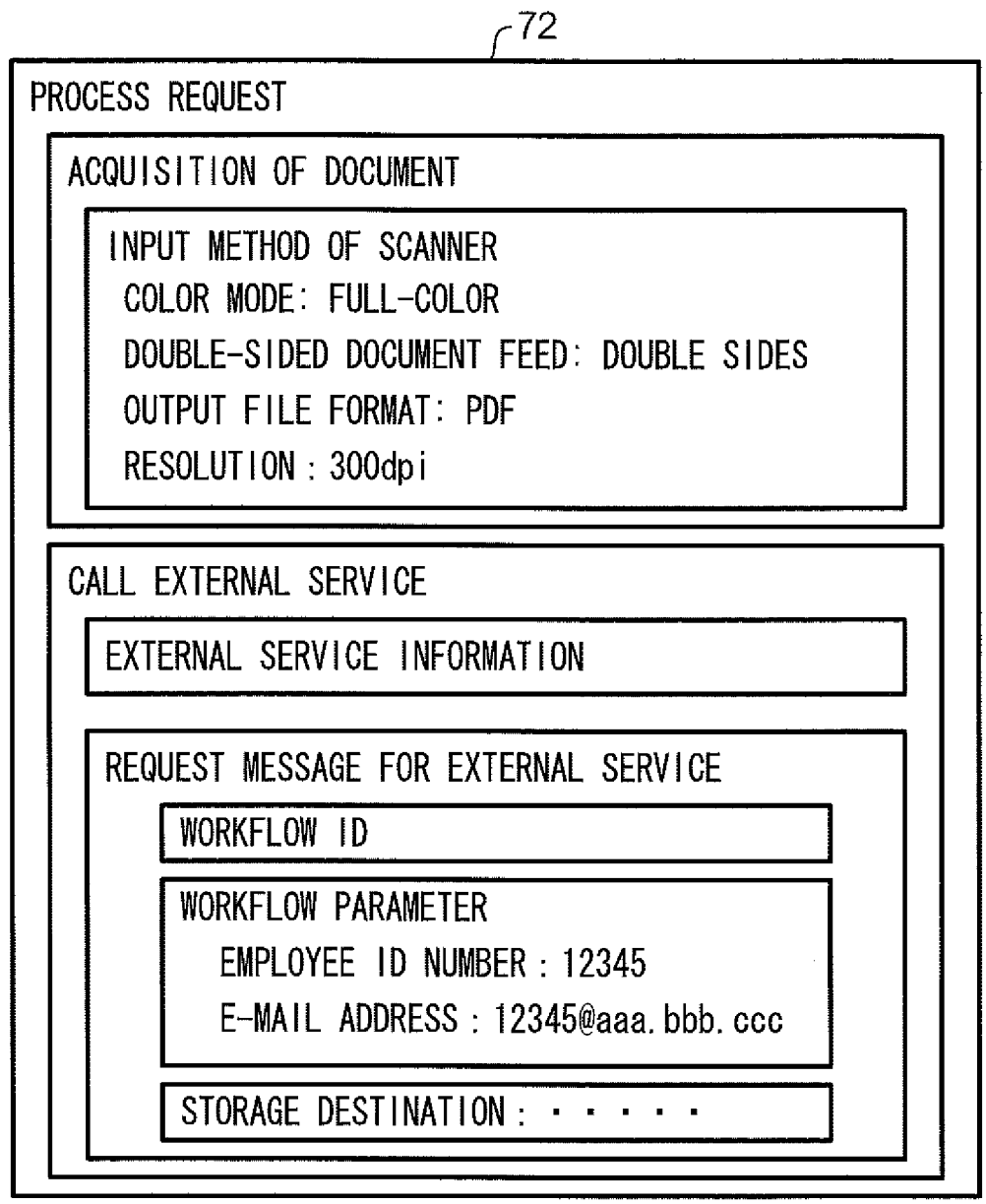
FIG. 15 is a diagram showing an overview of a description of instruction data.

When the first scan setting process or the second scan setting process has finished, workflow system 1 performs a process shown in FIG. 14. First, CPU 21 of image-forming device 20 sets the scan conditions and process conditions of the workflow stored to the instruction-generating script, which is read out in the first scan setting process or the second scan setting process. CPU 21 executes this instruction-generating script, and generates instruction data that instructs a process of reading a document and registering the read document to the workflow (Step S301). FIG. 15 is a diagram showing an overview of a description of instruction data 72. Instruction data 72 describes the set scan conditions and process conditions of the workflow in Extensible Markup Language (XML) format. If the first scan setting process has performed, scan conditions is set on scan settings screen 51 whose content is created by server device 10, and CPU 21 reads out instruction-generating script 143 sent from server device 10. In other words, if server device 10 sends instruction-generating script 143, CPU 21 generates instruction data that instructs to read an image in accordance with a scan condition, by executing the received instruction-generating script 143. In this case, the scan condition is set on scan settings screen 51 whose content is created by server device 10. Meanwhile, If the second scan setting process has been performed, scan conditions is set on scan settings screen 61 whose content is created by image-forming device 20, and CPU 21 reads out instruction-generating script 243 stored in storage unit 24. In other words, if server device 10 instructs to create a content of a scan settings screen, CPU 21 generates instruction data that instructs to read an image in accordance with a scan condition, by executing instruction-generating script 243 stored in storage unit 24. In this case, the scan condition is set on scan settings screen 61 whose content is created by image-forming device 20.

CPU 21 performs image-reading process based on generated instruction data 72 (Step S302). More specifically, CPU 21 controls image-reading unit 26, and cause to read a document in accordance with the scan conditions described in instruction data 72. By this process, image data of the document is generated. CPU 21 sends the generated image data and instruction data 72 from communication unit 23 to server device 10 (Step S303). CPU 11 of server device 10 receives this image data and instruction data 72 via communication unit 13, and registers the received image data to the workflow described in received instruction data 72, in accordance with the process conditions of the workflow (Step S304). More specifically, CPU 11 stores the image data to the storage destination of storage unit 14, which is described in instruction data 72. Then, CPU 11 sends HTML data of a process complete screen that notifies normal completion of the workflow process, from communication unit 13 to image-forming device 20 (Step S305). CPU 21 of image-forming device 20 receives this HTML data via communication unit 23, and displays the process complete screen expressed by the received HTML data, on display operation unit 25 (Step S306). When the process complete screen is displayed, the user operates display operation unit 25 to instruct to end accessing to server device 10. In response to this instruction, CPU 21 ends accessing to server device 10, and displays an access end screen that notices access ended on display operation unit 25 (Step S307).

Modifications

The foregoing is a description of an exemplary embodiment, but the details of this exemplary embodiment may be modified as follows. Moreover, the following modifications may also be combined.

MODIFIED EXAMPLE 1

In the exemplary embodiment, image data generated by image-reading unit 26 is sent to server device 10 and stored in storage unit 14, but an output destination of image data is not limited to server device 10. For example, image data generated by image-reading unit 26 may be transferred to another device via server device 10.

MODIFIED EXAMPLE 2

In the exemplary embodiment, it is determined whether requesting image-forming device 20 is a known image-forming device by using model information of image-forming device 20, but information used for this determination is not limited to model information. For example, it may be determined that requesting image-forming device 20 is a known image-forming device by using information of a program version, or date of manufacture of image-forming device 20.

MODIFIED EXAMPLE 3

A device applied to an image-reading device is not limited to image-forming device 20 described above. For example, it may be applied to an image-reading device having a scan function.

MODIFIED EXAMPLE 4

A process of CPU 21 of image-forming device 20 may be performed by co-operation between CPU 21 and another hardware device, or performed by one or more hardware devices instead of CPU 21. A process performed by CPU 21 of image-forming device 20 or CPU 11 of server device 10 may be realized by one or more programs. Each program executed by CPU 11 of server device 10 and CPU 21 of image-forming device 20 may be stored in a computer-readable storage medium, such as, for example, a magnetic recording medium such as magnetic tape or a magnetic disk, an optical recording medium such as an optical disk, a magneto-optical medium, or a semiconductor memory. Moreover, the programs may also be downloaded through a communication network such as the Internet.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiments have been chosen and described to best explain the principles of the invention and its practical applications, thereby enabling others skilled in the art to understand the invention for use with various embodiments and with various modifications as suited to a particular use contemplated. It is intended that the scope of the invention be defined by the following claims and their equivalents.

What is claimed is:

1. An image-reading system comprising:
    a control device that includes:
    a first memory that stores first device information assigned to an image-reading device having predetermined image-reading functions;
    a first receiving unit that receives second device information; and
    a requesting unit that requests, if the received second device information is not included in the stored first device information, creation of a content of a settings screen for setting a scan condition; and
    an image-reading device that includes:
    an image-reading unit that reads an image and converts the image to image data;
    a second memory that stores function information expressing an available function of the image-reading unit;
    a first sending unit that sends second device information assigned to the image-reading device to the control device;
    a first creating unit that creates, if the requesting unit requests creation of a content of a settings screen, a content of a first settings screen for setting a scan condition supported by the available function of the image-reading unit expressed by the stored function information;
    a generating unit that generates, when a scan condition is set on the first settings screen whose content is created by the first creating unit, first instruction data to read an image in accordance with the set scan condition; and
    a reading controller that controls the image-reading unit based on the generated first instruction data, so that the image-reading unit reads an image in accordance with the set scan condition.

2. The image-reading system according to claim 1, wherein:
    the control device includes:
    an acquiring unit that acquires, if the received second device information is included in the stored first device information, the function information stored in the second memory; and
    a second creating unit that creates a content of a second settings screen for setting a scan condition supported by the available function of the image-reading unit expressed by the acquired function information;
    and wherein, if a scan condition is set on the second settings screen whose content is created by the second creating unit, the generating unit generates second instruction data to read an image in accordance with the set scan condition; and
    the reading controller controls the image-reading unit based on the generated second instruction data, so that the image-reading unit reads an image in accordance with the set scan condition.

3. The image-reading system according to claim 2, wherein:
    the first memory stores a first program generating the second instruction data;
    the second memory stores a second program generating the first instruction data;
    the control device includes
    a second sending unit that sends, if the received second device information is not included in the stored first device information, the stored first program to the image-reading device,
    the image-reading device includes
    a second receiving unit that receives the sent first program;
    if the requesting unit requests creation of a content of a settings screen, and a scan condition is set on the first settings screen, the generating unit generates the first instruction data, by executing the second program stored in the second memory; and
    if the second receiving unit receives the first program, and a scan condition is set on the second settings screen, the generating unit generates second instruction data, by executing the received first program.

4. A control device comprising:
    a memory that stores first device information assigned to an image-reading device having a predetermined image-reading function;

a receiving unit that receives, from an image-reading device, second device information assigned to the image-reading device;

a requesting unit that requests, if the received second device information is not included in the stored first device information, the image-reading device to create a content of a settings screen for setting a scan condition;

an acquiring unit that acquires, if the received second device information is included in the stored first device information, from the image-reading device, function information expressing an available function of the image-reading device; and a creating unit that creates a content of a settings screen for setting a scan condition supported by the available function'of the image-reading device expressed by the acquired function information.

5. A control method comprising:

storing first device information assigned to an image-reading device having a predetermined image-reading function;

receiving, from an image-reading device, second device information assigned to the image-reading device;

requesting, if the received second device information is not included in the stored first device information, the image-reading device to create a content of a settings screen for setting a scan condition;

acquiring, if the received second device information is included in the stored first device information, from the image-reading device, function information expressing an available function of the image-reading device; and creating a content of a settings screen for setting a scan condition supported by the available function of the image-reading device expressed by the acquired function information.

6. A non-transitory computer readable medium storing a program causing a computer to execute a process for control, the process comprising:

storing first device information assigned to an image-reading device having a predetermined image-reading function;

receiving, from an image-reading device, second device information assigned to the image-reading device;

requesting, if the received second device information is not included in the stored first device information, the image-reading device to create a content of a settings screen for setting a scan condition;

acquiring, if the received second device information is included in the stored first device information, from the image-reading device, function information expressing an available function of the image-reading device; and creating a content of a settings screen for setting a scan condition supported by the available function of the image-reading device expressed by the acquired function information.

* * * * *